United States Patent [19]

Poklacki et al.

[11] 4,038,207
[45] July 26, 1977

[54] STABILIZED HYDROCARBON GELS AND A METHOD FOR THEIR PREPARATION

[75] Inventors: Erwin Sigmund Poklacki, Arlington Heights; Reinis Kalnajs, Chicago, both of Ill.

[73] Assignee: Borg-Warner Corporation, Chicago, Ill.

[21] Appl. No.: 628,271

[22] Filed: Nov. 3, 1975

[51] Int. Cl.$^2$ .................. B01J 13/00; F17D 1/16
[52] U.S. Cl. ................................ 252/316; 44/7 D; 137/13; 252/8.55 R; 302/66
[58] Field of Search .............. 252/8.55 R, 32.5, 316; 166/308; 137/13

[56] References Cited

U.S. PATENT DOCUMENTS

| | | | |
|---|---|---|---|
| 2,596,844 | 5/1952 | Clark | 252/8.55 X |
| 3,494,949 | 2/1970 | Monroe et al. | 252/32.5 X |
| 3,757,864 | 9/1973 | Crawford et al. | 252/8.55 X |

*Primary Examiner* — Herbert B. Guynn
*Attorney, Agent, or Firm* — Richard J. Schlott

[57] ABSTRACT

Hydrocarbon gels formed from liquid hydrocarbons with pseudo double salts of alkyl acid orthophosphoric acids as gelling agents are made stable to the presence of excess caustic materials by the addition of an anhydride of a $C_2$ – $C_{10}$ carboxylic acid or dicarboxylic acid.

3 Claims, No Drawings

STABILIZED HYDROCARBON GELS AND A METHOD FOR THEIR PREPARATION

BACKGROUND OF THE INVENTION

This invention is directed to gelled hydrocarbon compositions which are stabilized to the presence of excess base. More particularly this invention is directed to gelled hydrocarbon compositions comprising liquid hydrocarbons, pseudo double salt gelling agents prepared from partial aluminum salts of alkyl acid orthophosphates by neutralizing with an inorganic base and a stabilizer to prevent breakdown by excess base, said stabilizer being an anhydride of a carboxylic acid, and to a method for stabilizing the hydrocarbon gels.

Partial aluminum salts of certain alkyl acid orthophosphates, when further neutralized with an inorganic base such as sodium hydroxide, ammonium hydroxide or the like, form pseudo double salts which are effective gelling agents for hydrocarbons. Hydrocarbon gels formed with these pseudo double salts are thixotropic, exhibiting high viscosity at rest and under low shear conditions and thus are capable of suspending large quantites of particulates such as sand without settling. These gels, even at very low concentrations, exhibit the ability to reduce fluid friction of hydrocarbons during high speed flow through pipes and orifices, thus decreasing the energy required to maintain fluid flow.

While these pseudo double salts have found a variety of applications where thixotropic gel properties and/or reduction in fluid friction are desired, their utility has been somewhat limited and their handling made more difficult by a high degree of sensitivity to alkalis. The hydrocarbon gels are formed only at or very near neutralization, and the presence of excess base either prevents formation of a gel or quickly destroys the gels once they are formed. For that reason it has not been possible to employ these pseudo double salts to prepare gelled compositions containing as suspended or dissolved components such materials as highly alkaline particulates or epoxy resins together with the commonly employed alkaline curatives. Additionally, formation of the gels requires care and precision in the neutralizing step to ensure that only a neutralizing amount of the base is added, thus making handling under field conditions by unskilled personnel difficult and subject to great risk that improper technique will result in high volumes of ungellable product.

SUMMARY OF THE INVENTION

It has now been found that hydrocarbon gels formed with pseudo double salt gelling agents are made stable to the presence of basic compounds by the use of carboxylic anhydrides. More particularly hydrocarbon gels formed by dispersing a partial aluminum salt of an alkyl orthophosphate into a liquid hydrocarbon and subsequently neutralizing the acidity with a second base to form a pseudo double salt and thereby gel the mixture will tolerate the presence of large quantities of basic materials without loss of the gel structure when a carboxylic anhydride is present in the gelled hydrocarbon.

DETAILED DESCRIPTION

The gelled hydrocarbon compositions which are stabilized by the method of this invention are those of the prior art which are formed by pseudo double salt gelling agents in liquid hydrocarbons. These pseudo double salt gelling agents are the product of neutralizing a partial aluminum salt of an alkyl acid orthophosphate with a second base. The partial aluminum salts are the product of the reaction of less than a stoichiometric quantity of a basic aluminum compound such as hydrated alumina with an alkyl acid orthophosphate.

The alkyl acid orthophosphates useful for the practice of this invention are the products of the reaction of alcohols with phosphorus pentoxide ($P_2O_5$). More particularly, they may be characterized as mixtures of monoalkyl diacid orthophosphates and dialkyl monoacid phosphates resulting from the reaction of mixed alcohols with $P_2O_5$ according to the classical formula $$P_2O_5 + 1.5\ ROH + 1.5\ R'OH \longrightarrow$$

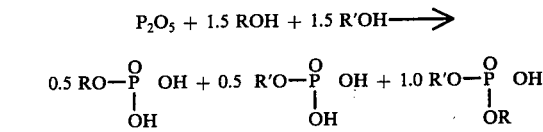

wherein R is a $C_1$–$C_5$ alkyl radical, and ROH is thereby a $C_1$–$C_5$ alkanol or a mixture thereof, R' is a $C_6$–$C_{22}$ alkyl or alkenyl radical, and R'OH is thereby a $C_6$–$C_{22}$ alkanol or alkenol or a mixture thereof. It will be understood that ROH and R'OH may be employed in ratios other than 1:1, and that an excess of the alcohols relative to the quantity of $P_2O_5$ may also be employed to hasten the reaction and to ensure complete conversion.

Whatever alcohols are employed, it will be seen that the product alkyl acid orthophosphate mixture will contain three reactive acidic groups for every two atoms of phosphorus, which may be represented by the formula $H_3$[alkyl orthophosphate]$_2$. This acidic structure will thus require three equivalents of a reactive base to completely neutralize the remaining acidity.

The partial aluminum salt of the alkyl acid orthophosphate is prepared by reacting less than a stoichiometric quantity of a basic aluminum compound such as hydrated alumina [Al (OH)$_3$] or aluminum isopropoxide [Al (OC$_3$H$_7$)$_3$] with the alkyl acid orthophosphate. The amount of basic aluminum compound employed may be varied between about 20 percent and about 70 percent, preferably between 20 and 50 percent of the stoichiometric amount, i.e. the amount required to fully neutralize the acidity of the alkyl acid orthophosphate. It has been found that the resulting partial aluminum salts containing less than about 20 percent of the stoichiometric amount of the aluminum component give very poor quality gels upon subsequent neutralization with a second base. At increasing levels of the aluminum component the partial aluminum salts become increasingly waxy in character and above about 50 percent of the stoichiometric quantity are more difficult to dissolve in the hydrocarbon. With further increases in the aluminum component, particularly above about 70 percent, the partial aluminum salts are hard waxy materials which are dissolved or dispersed hydrocarbons only with great difficulty, normally requiring prolonged stirring and heating.

The partial aluminum salt-forming reaction is carried out by mixing the basic aluminum compound and the alkyl acid orthophosphate and mildly heating the mixture to complete the reaction, e.g. from about 100° F. to about 250° F. While the process may be carried out in the absence of solvent, inert diluents such as kerosene, diesel fuel, aromatic hydrocarbons or naphtha may be employed if desired to moderate the reactions.

The resulting partial aluminum salts, which remain acidic in character by virtue of the incomplete stoichiometry employed, may be represented by the formula $$H_{(3-3x)} Al_x[\text{Alkyl orthophosphate}]_2$$

wherein $x$ is 0.2 to 0.70, as determined by the amount of basic aluminum compound used in their preparations. These complex compounds do not alone produce gels or more than a minor amount of thickening when dissolved or dispersed in hydrocarbons. To form a gel, it is necessary that the remaining acidity be neutralized.

The second base used to neutralize the remaining acidity and thus form hydrocarbon gels may be any base derived from an alkali metal or alkaline earth metal, including sodium hydroxide, potassium hydroxide, calcium oxide, barium oxide and the like, as well as ammonia, and basic salts thereof such as trisodium phosphate, borax, sodium carbonate, sodium silicate and the like. The second base may be added as a solid or may be first dissolved in water where soluble.

The product of the neutralizing reaction may be referred to as a pseudo double salt in that it is the alkyl orthophosphate of aluminum and the cation of the neutralizing second base. The pseudo double salt may be represented as $M^I_{(3-3x)}Al_x[\text{Alkyl orthophosphate}]_2$ when the second base employed is an alkali metal compound or ammonia, and as $M^{II}_{(3/2-3x)}Al_x[\text{Alkyl orthophosphate}]_2$ where the second base employed is an alkaline earth metal compound, $M^I$ representing the monovalent cation and $M^{II}$ representing a divalent cation, $x$ having a value between 0.2 and 0.70, preferably between 0.2 and 0.5.

The neutralization and gel-forming step will normally be carried out by first dissolving or dispersing the partial aluminum salt into a liquid hydrocarbon, then adding the requisite amount of second base while subjecting the mixture to high shear stirring. Thickening of the mixture will take place as the neutralization proceeds, however gelation of the mass will occur only at or very near the point where addition of the second base is complete. In this prior art practice for forming gels, it is essential that no excess base be added where no stabilizing agent is present because an excess of a strong base will destroy the gel structure.

The stabilizing agent which is employed to prevent the destruction of the hydrocarbon gel where excess base is employed is the anhydride of a $C_2-C_{10}$ carboxylic acid or dicarboxylic acid such as succinic anhydride, maleic anhydride, phthalic anhydride, acetic anhydride, benzoic anhydride and the like. The amount of stabilizing agent employed for the purpose of stabilizing the hydrocarbon gels will be greater than about 5 percent by weight based on the amount of pseudo double salt gelling agent present in the gelled hydrocarbon.

While far greater amounts of stabilizing anhydride may be employed, as a practical matter it will be undesirable to employ the anhydride in amounts greater than about a twice the weight of gelling agent used. The stabilizing anhydride compound may be added to the hydrocarbon prior to forming the gel, either together with the partial aluminum salt of the alkyl acid orthophosphate or separately therefrom, and thoroughly dispersed prior to carrying out the neutralization with the second base, or alternatively the stabilizing anhydride may be added to the pre-formed hydrocarbon gel.

The viscosity and strength of the resulting gel will depend in part upon the amount of gelling agent employed. Gels are formed at concentrations as low as 0.1 wt. percent of the gelling additive based on the final composition, and nearly solid immobile gels are formed at greater concentrations. While it is possible to form gels containing as much as 90 percent by weight gelling agent, as a practical matter at concentrations above about 10 percent by weight the gels are immobile and of little utility. The gel character of these compositions is retained at even lower concentrations than 0.1 wt. percent although the gel properties in the range 0.1 to 0.025 wt. percent are difficult to ascertain except by measurement of the bulk physical properties of the composition. Nonetheless, mixtures containing the gel at these low concentrations exhibit useful rheological properties including a marked reduction in fluid friction behavior when in high shear flow. It may be desirable, particularly when making low concentration gels, to prepare gels having 1.0 wt. percent or greater gelling agent as described above and then further dilute the gel by admixing with additional volumes of liquid hydrocarbon.

The practice of the present invention is further illustrated by means of the following examples which are not to be construed as limiting the scope of the invention.

EXAMPLE 1

A partial aluminum salt of an alkyl acid orthophosphate was prepared in the following manner: 112 g. of $P_2O_5$ were mixed with 74.7 g. of butyl alcohol and 384.2 g. (1.7 m.) of a commercial mixture of $C_{12}-C_{22}$ n-alkanols. The reaction mixture was heated to a gentle reflux and stirred until all the $P_2O_5$ had reacted.

The resulting mixture of alkyl acid orthophosphates was then reacted with 26.5 g. (42 percent of stoichiometry) of hydrated alumina by mixing the components and heating the mixture at 110° C. for about an hour. The resulting partial aluminum salt was a viscous oil.

The partial aluminum salt, when dispersed in diesel fuel at a level of 2 wt. percent appeared to disperse completely without producing any measurable increase in viscosity.

EXAMPLE 2

An alkyl acid orthophosphate was prepared from 53.8 g. of $P_2O_5$, 30.2 g. of n-butyl alcohol and 100 g. of a commercial mixture of n-octanol, n-hexanol and n-decanol, substantially as described in Example 1. One hundred grams of the resulting mixture were then reacted with 6.2 g. (30% of theory) of hydrated alumina by heating the mixture at 110° C. for approximately one hour, while water was allowed to evaporate. The resulting partial aluminum salt, when cooled, was a viscous oil. When dispersed in diesel fuel at a level of 2 wt. %, no visible increase in viscosity occurred.

EXAMPLES 3-9

The partial aluminum salts of Examples 1 and 2 were employed in the preparation of the gels employing the formulations shown in Table I. The gels were formed by first dispersing the indicated amount of partial aluminum salt in 200 ml. of diesel fuel, then placing the mixture in a Waring Blendor and stirring while adding the given amount of stabilizing anhydride. The mixture was then neutralized by dropwise addition of 30% aqueous caustic to form the gel.

TABLE I

EFFECT OF ANHYDRIDES ON GEL STABILITY

| Example No. | Gelling Agent Example No. | ml. | Stabilizing Agent[1] Anhydride | g. | 30% NaOH[2] Drops | Result |
|---|---|---|---|---|---|---|
| 3 (control) | 1 | 2.4 | | 0 | 13 | Thick gel |
| 3A | | | | | 16 | Thin gel |
| 3B | | | | | 18 | Breaks gel |
| 4 | 1 | 2.4 | Suc. A. | 17 | 13 | Thick gel |
| 4A | | | | | 26 | Thick gel |
| 4B | | | | | 150 | Gel |
| 5 | 1 | 2.4 | Suc. A. | 1.7 | 15 | Thick gel |
| 5A | | | | | 24 | Thick gel |
| 5B | | | | | 28 | Breaks gel |
| 6 | 1 | 4.0 | Suc. A. | 17 | 19 | Thick gel[3] |
| 6A | | | | | 25 | Thick gel |
| | | | | | 100 | Thick gel |
| 7 | 2 | 0.8 | Suc. A. | 0.28 | 4 | Gel, 148 cps.[4] |
| 7A | | | | | 6 | Gel, 148 cps. |
| 7B | | | | | 8 | Gel, 150 cps. |
| 7C | | | | | 10 | Thin, 50 cps. |
| 8 | 2 | 0.8 | Norb. A. | 0.28 | 4 | Gel, 180 cps.[4] |
| 8A | | | | | 10 | Gel, 452 cps. |
| 8B | | | | | 14 | Gel, 180 cps. |
| 9 | 2 | 0.8 | Acetic | 0.28 | 4 | Gel, 142 cps.[4] |
| 9A | | | | | 8 | Gel, 150 cps. |
| 9B | | | | | 14 | Gel, 210 cps. |

Notes:
[1]Suc. A. = Succinic Anhydride; Norb. A. = x-methyl-5-norbornene-2,3-dicarboxylic anhydride; Acetic = Acetic Anhydride.
[2]Examples 3-6 employed 30% aqueous caustic; Examples 7-9 employed 15% aqueous caustic.
[3]Gel w/o anhydride breaks at 25 drops.
[4]Gel w/o stabilizing agent, 190 cps; breaks at 5 drops.

Thus it will be seen that hydrocarbon gels prepared from pseudo double salts alone are quickly destroyed when excess base is present (Example 3). When stabilized by the addition of succinic anhydride (Examples 4–7), large excesses of caustic are tolerated without destroying the gel. Similarly, x-methyl-5-norbornene dicarboxylic anhydride (Example 8) and acetic anhydride (Example 9) are effective stabilizers for these gels. It will be noted in Examples 7–9 that addition of the anhydride to these low concentration gels effected an initial lowering of the gel viscosity; nonetheless the gel character was retained. In a separate example, phthalic anhydride was employed as the gel stabilizing agent and gel viscosity dropped sharply but gel character was retained until 100 percent of an excess of caustic had been added.

The invention will thus be seen to be a method for stabilizing gelled hydrocarbon compositions prepared from pseudo double salt gelling agents by adding thereto a carboxylic anhydride such as succinic anhydride. The stabilizing of these gels permits their use where excessive amounts of alkaline materials may be present as for example where employed to suspend and/or transport highly caustic particulate materials, and provides the added advantage of ease of handling since criticality in the neutralizing step is reduced.

The gel-stabilizing method of the instant invention will also be applicable to certain prior art methods for gelling hydrocarbons such as for example the method disclosed in U.S. Pat. No. 3,757,864, wherein alkyl orthophoric acids are reacted with stoichiometric quantities of sodium aluminate to provide hydrocarbon gels which are sensitive to the presence of an excess of caustic materials.

Further modifications and variations of the invention will be apparent to those skilled in the art which will not depart from the spirit and scope thereof, and the invention in its broadest aspects is set forth by the following claims.

We claim:

1. A method for stabilizing a mixture of (a) a liquid hydrocarbon and (b) a gelling amount of a pseudo double salt prepared from a partial aluminum salt of an alkyl acid orthophosphate, said alkyl acid orthophosphate being the mixture of monoalkyl diacid orthophosphates annd dialkyl monoacid orthophosphates obtained by reacting phosphorus pentoxide with a mixture of alcohols containing at least one alcohol selected from the group consisting of $C_1$ to $C_5$ alkanols and $C_1$ to $C_5$ alkenols and at least one alcohol selected from the group consisting of $C_6$ to $C_{22}$ alkanols and $C_6$ to $C_{22}$ alkenols, said partial aluminum salt being prepared by reacting said alkyl orthophosphate with from about 20 percent to about 70 percent of the stoichiometric amount of a basic aluminum compound selected from the group hydrated aluminum and aluminum isopropoxide, and a neutralizing amount of a second base selected from the group consisting of alkali metal hydroxides, alkaline earth metal hydroxides alkali metal oxides, alkaline earth metal oxides, ammonia, basic salts of alkali metals and basic salts of alkaline earth metals comprising adding to said mixture from 5 to 200 percent by weight, based on said pseudo double salt, of a carboxylic anhydride selected from the group consisting of the anhydrides of $C_2$ to $C_{10}$ mono carboxylic acids and the anhydrides of $C_2$ to $C_{10}$ dicarboxylic acids.

2. In a method for gelling liquid hydrocarbons comprising the steps of dispersing an effective amount of a partial aluminum salt of an alkyl acid orthophosphate into a liquid hydrocarbon, said alkyl acid orthophosphate being the mixture of monoalkyl diacid orthophosphates and dialkyl monoacid orthophosphates obtained by reacting phosphorus pentoxide with a mixture of alcohols containing at least one alcohol selected from the group consisting of $C_1$ to $C_5$ alkanols and $C_1$ to $C_5$ alkenols and at least one alcohol selected from the group consisting of $C_6$ to $C_{22}$ alkenols and $C_6$ to $C_{22}$ alkenols said partial aluminum salt being prepared by reacting said alkyl orthophosphate with from about 20 percent to about 70 percent of the stoichiometric amount of a basic aluminum compound selected from the group hydrated aluminum and aluminum isopropoxide, and then adding a second base in an amount sufficient to neutralize the acidity of said partial aluminum salt to thereby give a gelled mixture, the improvement wherein from 5 to 200 percent by weight, based on the amount of partial aluminum salt employed, of a carboxylic anhydride selected from the group consisting of the anhydrides of $C_2$ to $C_{10}$ monocarboxylic acids and the anhydrides of $C_2$ to $C_{10}$ dicarboxylic acids are present in the gelled mixture.

3. A gelled hydrocarbon composition comprising a liquid hydrocarbon, from 0.2 to 10 percent by weight based on hydrocarbon of a gelling agent consisting of the pseudo double salt of an alkyl acid orthophosphate, said alkyl acid orthophosphate consisting of the mixture of monoalkyl diacid orthophosphates and dialkyl monoacid orthophosphates obtained by reacting phosphorus pentoxide with a mixture of alcohols containing at least one alcohol selected from the group consisting of $C_1$ to $C_5$ alkanols and $C_1$ to $C_5$ alkenols and at least one alcohol selected from the group consisting of $C_6$ to $C_{22}$ alkanols and $C_6$ to $C_{22}$ alkenols, with from 20 percent to about 70 percent of a stoichiometric amount of aluminum and a second cation selected from the group consisting of alkali metals, alkaline earth metals and ammonia, and from 5 to 200 percent by weight, based on gelling agent, of a carboxylic anhydride selected from the group consisting of the anhydrides of $C_2$ to $C_{10}$ carboxylic acids and the anhydrides of $C_2$ to $C_{10}$ dicarboxylic acids.

* * * * *